United States Patent

[11] 3,581,225

[72] Inventor Horst Rothe
Geigersbergstrasse 17, 7500 Karlsruhe-Durlach, Germany
[21] Appl. No. 764,755
[22] Filed Oct. 3, 1968
[45] Patented May 25, 1971
[32] Priority Oct. 4, 1967
[33] Germany
[31] P 15 37 653.1

[54] TRANSISTORIZED POWER AMPLIFIER
8 Claims, 10 Drawing Figs.

[52] U.S. Cl. .......... 330/28, 330/21, 330/31
[51] Int. Cl. .......... H03f 1/08
[50] Field of Search .......... 330/21, 31, 28, 24, 95, 167, 105; 328/21

[56] References Cited
UNITED STATES PATENTS

| | | | |
|---|---|---|---|
| 3,248,672 | 4/1966 | Zuleeg .......... | 331/117X |
| 2,824,175 | 2/1958 | Meacham et al. .......... | 330/24X |
| 2,994,040 | 7/1961 | Waldhauer .......... | 330/28 |
| 3,234,480 | 2/1966 | Maeda .......... | 330/21 |
| 3,325,745 | 6/1967 | Sosin et al. .......... | 330/31 |
| 3,450,998 | 6/1969 | Greefkes et al. .......... | 330/24X |

*Primary Examiner*—Roy Lake
*Assistant Examiner*—James B. Mullins
*Attorney*—Spencer and Kaye

ABSTRACT: A transistor power amplifier whose high frequency power conversion efficiency is improved by the application of an input alternating control voltage whose waveform is adjusted to compensate for the voltage drops due to current flow between the transistor base-emitter junction and both the base terminal and the collector terminal of the transistor so as to impart the desired waveform to the output current at the transistor collector terminal.

JNVENTOR
HORST ROTHE

BY Spencer & Kaye
ATTORNEYS

JNVENTOR
HORST ROTHE

BY Spencer & Kaye
ATTORNEYS

INVENTOR
HORST ROTHE

BY Spencer & Kaye
ATTORNEYS

INVENTOR
HORST ROTHE

BY Spencer & Kaye
ATTORNEYS

INVENTOR
HORST ROTHE

BY Spencer & Kaye
ATTORNEYS

INVENTOR
HORST ROTHE

BY Spencer & Kaye
ATTORNEYS

TRANSISTORIZED POWER AMPLIFIER

BACKGROUND OF THE INVENTION

The present invention relates to a transistor power amplifier, and particularly to an amplifier having a high power conversion efficiency at high frequencies.

It is known that the maximum alternating current power which can be delivered from a transistor to a matched load resistance under optimum operating conditions quickly decreases as the alternating current frequency increases above a predetermined frequency, depending on the type of transistor used, when compared with the maximum power output at frequencies below that predetermined frequency. Figure 1 is a graph illustrating this frequency dependency, which is valid for all transistors.

Below a certain frequency, which is indicated as $w_1$ in FIG. 1, the available alternating current power P is substantially frequency-independent and is determined only by the limiting parameters of the transistor, i.e., particularly the collector power loss and the collector DC potential, as well as by the values of the DC input bias and base-emitter AC voltage. Above the frequency $w_1$ the maximum available alternating current power rapidly decreases with increasing frequency.

In order to understand the factors affecting the operation of a transistor amplifier, the components of certain circuit parameters must first be considered. The base impedance consists of the internal base resistance ($R_{BB'}$) which exists between the emitter-base junction and the external base contact, the contact resistances, the base lead impedances, and possibly the base impedances present in the external base lead. The emitter impedance results from the internal resistance between the emitter contact and the emitter-base junction, the contact resistances and the emitter lead impedances. Contact resistances exist, for example, between the leads and the transistor electrodes.

The present invention is based on theoretical considerations whose validity has been confirmed by practical experiments. In order to better understand the considerations on which the present invention is based, the relationships existing in the known operation of power transistors shall first be examined.

The basic measuring circuit of FIG. 2 can be used to determine the alternating current power capability of a transistorized power amplifier, where a PNP transistor 1 is connected in a common emitter configuration, by way of example. The load resistance connected between the collector and emitter terminals C and E across the output of the transistor 1 consists of a parallel resonant circuit 3 which is tuned to resonance at the measuring frequency so that its effective resistance is actually equal to $R_a$. The direct collector biassing voltage $\overline{U}_{ce}$ is also applied between C and E.

In the collector current $i_c(t)$, essentially only the fundamental component $\hat{I}_{cw}$ at the measuring frequency produces a voltage drop across the load resistance and delivers the useful power $\tilde{P}=\frac{1}{2}\hat{I}^2_{cw}R_a$ to $R_a$, whereas the value of the direct current component $\overline{I}_c$ of $i_c(t)$ determines the value of the delivered DC power $\overline{P}=\overline{I}_c\overline{U}_{ce}$.

At the input side of the transistor the AC signal voltage $u_{be}(t)$ is applied between the base and emitter terminals B and E of the transistor, as is a direct biassing voltage $\overline{U}_{be}$. However, insofar as concerns the current in the transistor, the AC voltage $u_{b'e}(t)$ appearing within the transistor across the emitter-base junction constitutes the determining factor and not the voltage $u_{be}(t)$ applied between the external transistor terminals. This alternating voltage $u_{b'e}(t)$ is not equal to $u_{be}(t)$ due to the voltage drop across the impedances existing between the external connecting terminals and the internal junction. It is accepted practice, and permissible for approximation purposes, to treat the impedances associated with the base as a combined base impedance $Z_b$ connected between the external base terminal B and a fictitious internal base terminal B' which is considered to be disposed directly at the base side of the emitter junction. At this point B' there then appears the current controlling alternating voltage $U_{b'e}(t)$, which may be expressed by $U_{b'e}(t)=U_{be}(t)-U_{bb'}(t)$ where $U_{bb'}(t)$ represents the voltage drop across impedance $Z_b$. The current through $Z_b$ is represented by $i_b(t)$. The generally smaller impedance $Z_e$ in the emitter lead also exerts an influence on the controlling voltage at the emitter junction.

In order to achieve as high a conversion efficiency as possible between the direct current power fed to the collector and the alternating current delivered to $R_a$ the current must be regulated in such a manner that a collector current pulse will occur only during part of the alternating current cycle, which part is preferably equal to or smaller than half a cycle. If the period of collector current flow is expressed as an angle of $2\theta=360°$ for a current flow during the entire cycle, the current flow angle $\theta$ represents one-half the period of current flow. A control of the transistor input by a bias voltage $\overline{U}_{be}=0$ results in Class B operation, while a control employing a direct bias $\overline{U}_{be}$ which is poled in the emitter junction blocking direction results in Class C operation.

An examination of the current and voltage control and the alternating current output both below and above the frequency $w_1$ of FIG. 1 reveals the following general situation.

At $w\approx 0.5w_1$ during Class B operation ($\overline{U}_{be}=0$), with a $\overline{U}_{ec}=20V$ and a collector DC power dissipation of $\overline{P}_r=4W$, the available alternating current power is $\tilde{P}\approx 15w$. and the power conversion efficiency $\eta\approx 79$ percent. The waveforms of the collector current $i_c(t)$, the alternating collecter voltage $U_{ce}(t)$ and the base current $i_b(t)$ are shown in FIG. 3 and are based on oscillograph recordings. $i_c(t)$ has a current flow angle of about $\theta=90°$ corresponding to the biassing conditions at the transistor input side. The waveform of $i_c(t)$ corresponds to the exponential characteristic of the collector current. The curve of $i_b(t)$ has a waveform which is substantially proportional to $i_c(t)$ and a relative amplitude dependent on the current multiplication factor $\beta$. However, the base current $i_b(t)$ has a superimposed interference component of small amplitude.

When the measuring frequency is increased to approximately $10w_1$, under the identical operation conditions ($\overline{U}_{be}=0$; $\overline{U}_{ec}=20\ V$; $\overline{P}_v=4W$) the available alternating current power falls to $\tilde{P}\approx 6W$, i.e. the conversion efficiency decreases to $\eta\approx 60$ percent. FIG. 4 shows the waveforms of $u_{be}(t)$, $i_c(t)$ and $i_b(t)$ occurring under these conditions. The current flow angle of the collector current $i_c(t)$ has increased to $\theta=135°$, although the biasing continues to be that for Class B operation with $\overline{U}_{be}=0$. The peak of $i_c(t)$ is moreover considerably flattened. Both phenomena result in a decrease in the power delivered by the fundamental frequency component of these current pulses and thus in the power conversion efficiency. Moreover, the waveform of $i_b(t)$ exhibits a noticeable change, since it is no longer substantially proportional to $i_c(t)$, but is significantly influenced by a factor which is proportional to the time differential $di_c(t)/dt$.

The increasing influence of this latter factor on $i_b(t)$ with increasing frequency can be explained on the basis of transistor theory. According to this theory, a change in the current flow from emitter to collector is accompanied by a redistribution of the charges stored in the base region and in the emitter junction. A change in the diffusion current through the base layer can not occur unless a change in the concentration of the minority carriers stored therein has taken place.

It is possible to calculate the base current, which is thus of necessity related to the collector current $i_c(t)$, to a first approximation, if it is assumed that the charge carriers required for the redistribution flow either in or out only through the base lead and if the diffusion periods of these carriers are short in relation to the period of a complete electrical cycle. The following relation then exists:

$$i_b(wt)=\frac{i_c(wt)}{\beta}+\frac{w}{w_a}\cdot\frac{di_c(wt)}{d(wt)} \qquad (1)$$

where $w_a$ is known $\alpha$ cutoff frequency and $\beta$ is the grounded emitter current amplification factor of the transistor.

If it is assumed that the dependency of the collector current $i_c(wt)$ on the internal control voltage $u_{b'e}(wt)$ at the emitter junction is $$i_c(wt)=I_{c0}\exp[u_{b'e}(wt)/U_T] \qquad (2)$$

where $I_{c0}$ is the collector cutoff current (when $u_{b'e}(wt)=0$) and $U_T$ is the known temperature coefficient, it results that $$i_b(wt)=\frac{I_cO}{\beta}\left(\exp\frac{u_{b'e}(wt)}{U_T}\right)\left[1+\frac{\beta}{U_T}\cdot\frac{w}{w_\alpha}\cdot\frac{du_{b'e}(wt)}{d(wt)}\right] \qquad (3)$$

Then, the external control voltage for the equivalent circuit of the transistor as shown in FIG. 2 is derived as:

$$u_{be}(wt)=u_{b'e}(wt)+u_{bb'}(wt). \qquad (4)$$

The numerical integration of these equations with the aid of a calculator will aid in the determination of the waveforms of $u_{b'e}(wt)$ and $i_c(wt)$ and $i_b(wt)$ when a sinusoidal input control voltage $u_{be}(wt)=\hat{U}_{be}\sin wt$ is applied and when the data for $\beta$, $w_\alpha$ and $Z_b$ are known. $Z_b$ can here be chosen to be equal to the actual base resistance $R_{BB}$, as long as the influence of the lead inductances remains low.

Such calculations result in waveforms for $i_c(wt)$ and $i_b(wt)$ which substantially coincide with the curves shown in FIG. 4.

The present invention is based on the realization that the decrease in the available output power from transistors at high frequencies is caused predominantly by the voltage drops occurring across the impedances through which the base and/or emitter currents flow.

In spite of substantial efforts made in recent years, it has not been possible to sufficiently reduce the amplitudes of these impedances, particularly of the base resistance $R_{BB'}$. Moreover, even if it were possible to substantially reduce the values of the impedances which are responsible for these undesirable voltage drops, a lower limit would be reached below which operation could not occur.

SUMMARY OF THE INVENTION

It is a primary object of the present invention to overcome these drawbacks and difficulties.

Another object of the invention is to substantially improve the high frequency power conversion efficiency of a transistor power amplifier.

Still another object of the invention is to compensate for power-decreasing influences to which the transistor output current is subjected at high frequencies.

It is a more specific object of the present invention to provide a transistorized power amplifier in which, for a given type of transistor, the maximum alternating current power which can be delivered at the output is substantially higher than in the known arrangements.

These and other objects according to the invention are achieved by the provision, in a transistorized power amplifier including a transistor having base, emitter and collector terminals of the improvement composed of control voltage supply means connected between the base and emitter terminals for applying there across an alternating voltage whose waveform differs from that of the resulting voltage across the base-emitter junction of the transistor and is shaped for compensating for the voltage drops across the impedances through which at least one of the base and emitter currents flow between both the base terminal and the emitter terminal and the base-emitter junction so as to impart the desired waveform to the output current at the collector terminal.

This compensation must occur for those periods during which the emitter-base junction of the power transistor is poled in the forward direction of current flow. Whereas such current polarity occurs continuously during Class A operation of the power amplifier, it occurs for only a portion of each electrical cycle during Class AB, B and C operation.

BRIEF DESCRIPTION OF THE DRAWINGS

FIGS. 1—4 have already been described in detail.

DESCRIPTION OF THE PREFERRED EMBODIMENTS

The present invention involves an entirely new and different approach in that, as already mentioned, an external alternating control voltage is applied to the power transistor between the external base terminal B and the external emitter terminal E.

The waveform of this external alternating control voltage differs from that of the internal alternating control voltage which is directly applied to the emitter-base junction in such a manner that the output current is given the desired waveform in spite of the voltage drops across the impedances through which the base and/or emitter currents flow between the external base and emitter terminals and the emitter-base junction The term "waveform" is here intended to mean a certain voltage variation with respect to time.

Figure 1:
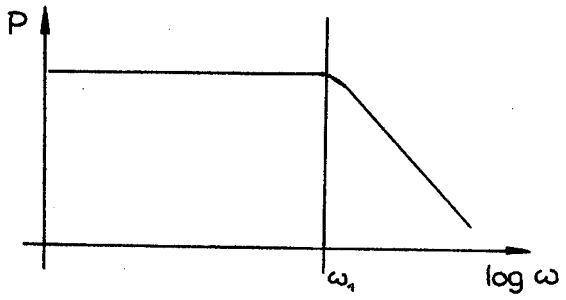
FIG. 1 is a graph illustrating one operating characteristic of transistor power amplifiers.
Figure 2:
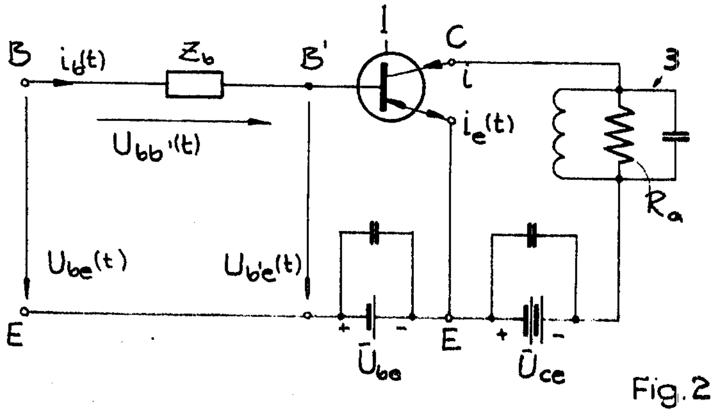
FIG. 2 is a schematic diagram of a measuring circuit employed in the development of the present invention.
Figure 3:
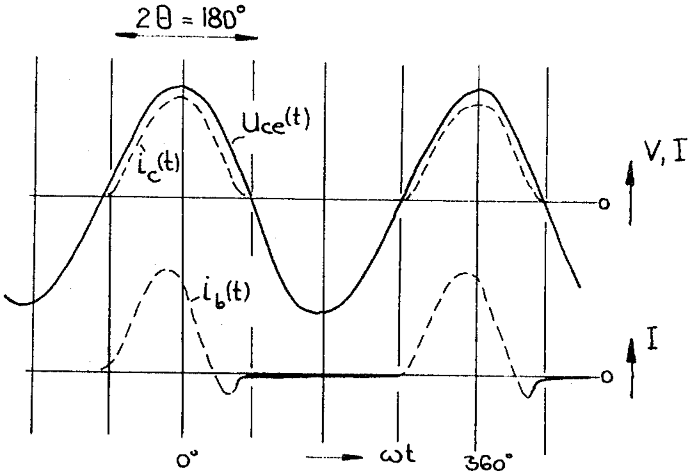
FIG. 3 is a graph showing waveforms relating to the operation to the circuit of FIG. 2 under certain conditions.

Thus, according to the invention, the power conversion efficiency of a transistor is improved above the frequency $w_1$ of FIG. 1 in that the external alternating control voltage $u_{be}(t)$ which is applied between the external base terminal and the external emitter terminal is reshaped with respect to the desired (e.g. sinusoidal or partially sinusoidal) alternating control voltage $u_{b'e}(t)$ across the emitter-base junction in such a manner that the voltage drops across the impedances through which the base and/or emitter currents flow are entirely or partially compensated and a desired output current waveform results.

The applied alternating control voltage according to the present invention is preferably selected so that the internal alternating control voltage $u_{b'e}(t)$ applied directly across the emitter-base junction is given a sinusoidal shape. When the applied alternating control voltage $u_{be}(t)$ is so selected, during Class B or Class C operation of the power amplifier, the alternating control voltage applied directly to the emitter-base junction need have a sinusoidal shape only over the forward conduction portion of its cycle.

The requirement that the internal alternating control voltage $u_{b'e}(t)$ applied directly across the emitter-base junction be sinusoidal is met, according to the present invention, for example, by causing the external alternating control voltage $u_{be}(t)$ which is applied to the power transistor input to contain one or a plurality of harmonics of the fundamental frequency.

The alternating control voltage $u_{be}(t)$ required between base and emitter of the power transistor is created, according to the present invention, for example, by superimposing an additional voltage on the voltage to be amplified at the desired frequency. This additional voltage is derived with the aid, for example, of an appropriate additional impedance connected in the transistor base lead.

It is recommended, according to a further development of the present invention, to amplify the voltage which is to be applied across the additional impedance by means of an amplifier and to then superimpose the operating frequency thereon. If the transistor power amplifier is provided with preliminary stages, it is recommended, according to the present invention, to superimpose the voltage across the additional impedance on the voltage at the operating frequency at the input of one of the preliminary stages.

According to the present invention, it is possible to also superimpose an additional voltage whose waveform is derived from the collector or emitter current of the power transistor on the operating frequency voltage to be amplified. Such an additional voltage can be derived, for example, according to the present invention, from one or a plurality of series-connected diode(s) which are provided in the emitter leads and which are poled to be operative in the forward direction.

Figure 5:
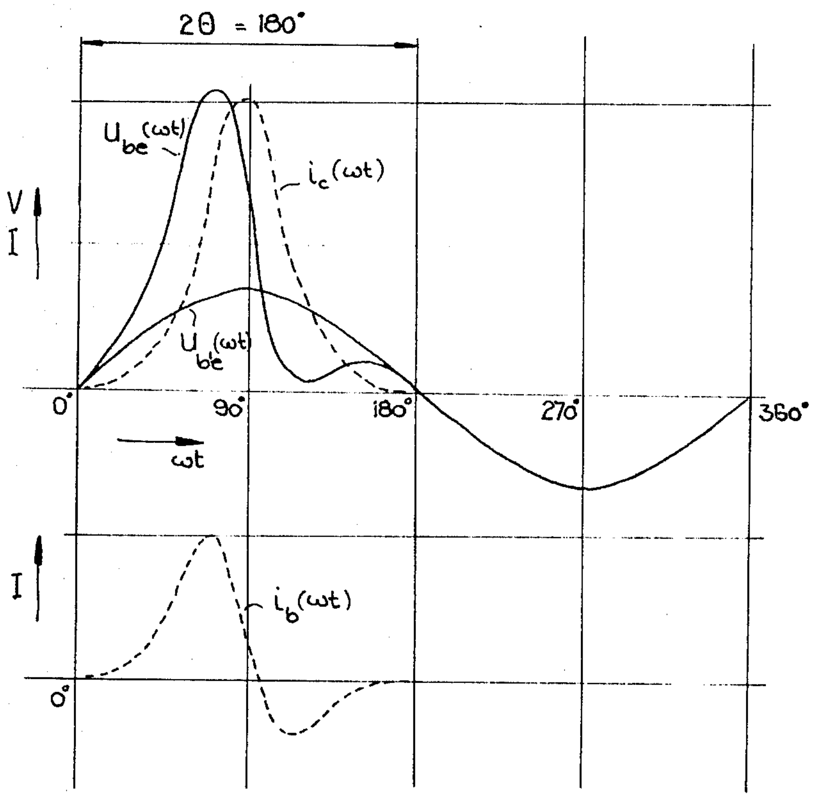
FIG. 5 is a view similar to that of FIG. 3 showing curves used in explaining the principles of the present invention.

The present invention will be explained below with the aid of a simple example which is based on the above theoretical relationships. The requirement may be made that $u_{b'e}(wt) = \hat{U}_{b'e}\sin wt$. When equation (2) is applicable, the waveform of $i_b(wt)$, and thus also the external voltage $u_{be}(wt)$, can be derived with the aid of equations (3) and (4). FIG. 5 shows the result of plotting such equations for a transistor having $\beta=45$, $R_b=\Omega$, with Class B operation, and at a frequency for which $$\beta\frac{w}{w_\alpha}\approx 1$$

. Without the improvement of the present invention, the alternating current output power at this frequency would decrease, with respect to that available at lower frequencies, approximately at the ratio of 15:6.

In order to achieve a sinusoidal waveform for the internal control voltage $u_{b'e}(wt)$, an external control voltage $u_{be}(wt)$ must be applied to the external terminals, which control voltage has a definite peak in the positive direction with a duration of only one-fourth cycle. Between $wt=180°$ and $360°$ the precise waveform of $u_{be}(wt)$ is of no importance, provided that $u_{b'e}(wt)$ maintains the polarity which blocks forward current flow.

Under these control conditions, $i_c(w\ t)$ is definitely pulse-shaped. The distance between the instants when $i_c(w\ t)=I_{c0}$ here corresponds to the current flow angle, or period, $2\theta=180°$. The alternating current power available to $R_a$ in this ideal case is equal to that available at low frequencies.

The lower curve in FIG. 5 shows the calculated waveform of $i_b(w\ t)$ to a 10x scale with respect to the curve of $i_c(w\ t)$. It is important that the waveform of the external control voltage between terminals B and E be such as to render possible this current flow $i_b(w\ t)$ which contains a considerable portion of the second and higher harmonics of the control voltage frequency.

Figure 6:
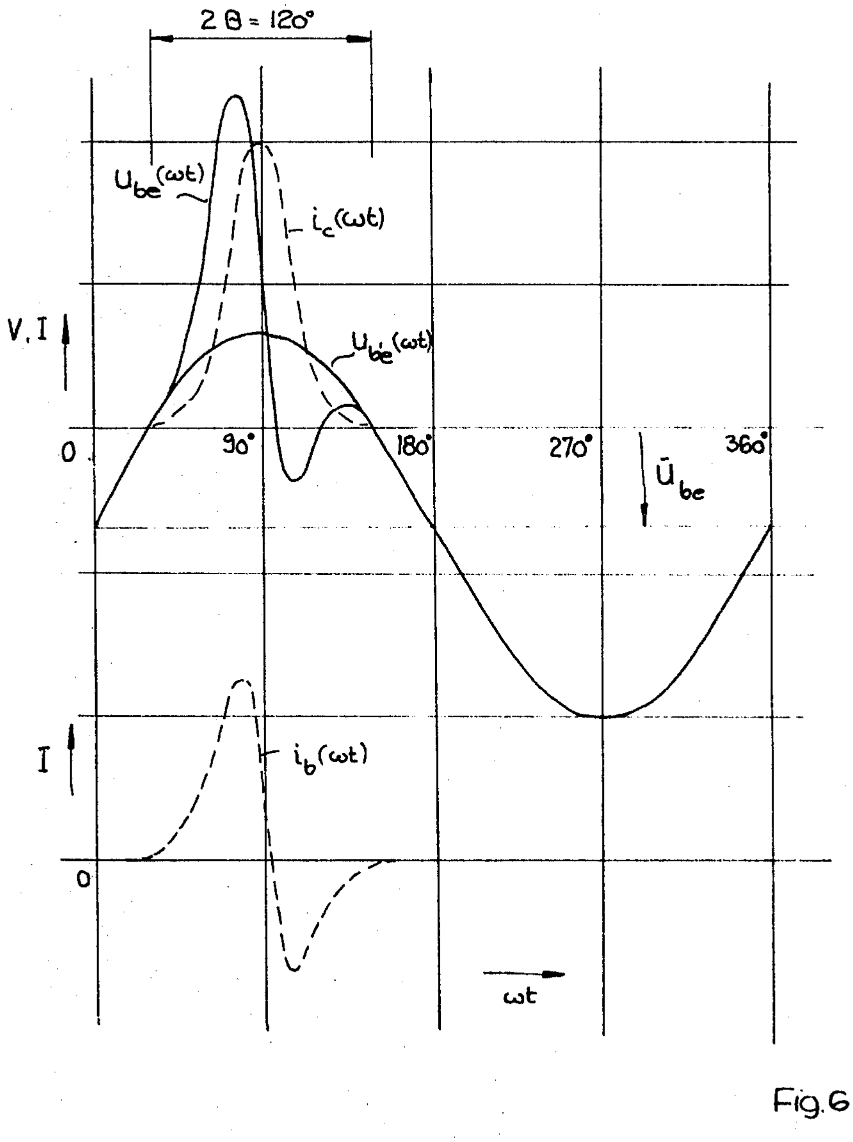
FIG. 6 is a view similar to that of fIG. 5 relating to another form of the invention.

If it is intended to achieve an output current waveform control comparable to that described with reference to FIG. 5, again with a sinusoidal waveform for the internal control voltage $U_{b'e}(wt)$, but with a collector current flow angle of $\theta=60°$, an even more sharply defined and shorter pulse peak for $u_{be}(w\ t)$ is necessary, as is shown in the plotted curves of FIG. 6. Correspondingly, the base current $i_b(w\ t)$ is of shorter duration and contains a considerable portion of the fourth and higher harmonics of the control frequency.

In order to realize the desired waveform for the internal control voltage, e.g. the sinusoidal waveform $u_{b'e}(w\ t)=\hat{U}_{b'e}\sin w\ t$ mentioned in the example, it is necessary, in conformance with these considerations, at frequencies $>w_1$, to apply an external control voltage $u_{be}(w\ t)$ having a positive polarity portion $\alpha<\theta$ during the desired input current flow period $\theta$ to the external input terminal B. This shorter voltage pulse can be produced in one of the preliminary control stages, for example by arranging one of these preliminary stages to have an aperiodic resistance at its output and to be controlled sinusoidally in Class C operation so that the desired short-duration voltage pulse for controlling the final stage is produced at its output. It is, however, necessary, as already mentioned above, to provide an internal source resistance for the control stage which permits the flow of the base current $i_b(w\ t)$. This low source resistance can be created, for example, by interconnection of a common collector stage.

It is also possible to produce the required control voltage pulse with the aid of a synchronized sawtooth oscillator.

Figure 7:
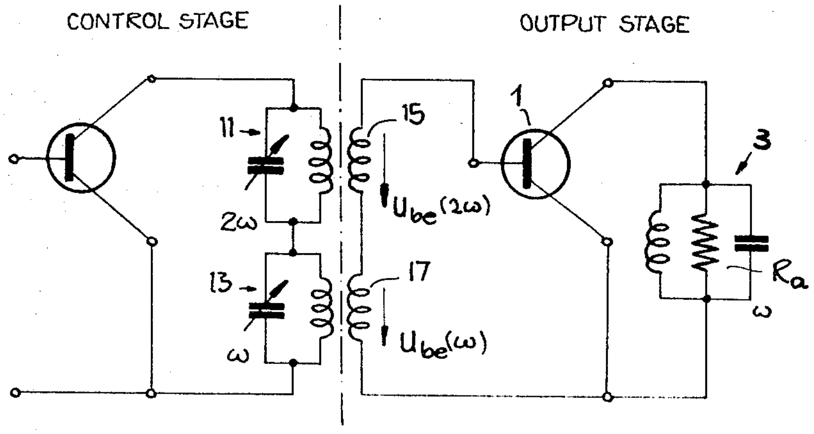
FIG. 7 is a simplified circuit diagram of one embodiment of the invention.

FIG. 5 illustrates that the external control pulse waveform necessary for an internal sinusoidal control voltage $u_{b'e}(w\ t)$ consists, for an output current pulse whose duration is such that $\theta=90°$, predominantly of the superposition of voltages at the frequencies $w$ and $2w$. Simultaneous regulation by voltages having these two frequencies, and suitable amplitudes and phase relations, which can be achieved, for example, in the circuit of FIG. 7, by itself produces a considerable improvement in the power conversion efficiency at frequencies of $w>w_1$. If in this circuit the control stage is adjusted so as to carry out a Class C operation, the two control voltages can be set to optimum values by tuning the two resonant circuits 11 and 13 in the control transistor collector-emitter circuit and by coupling them to the input coils 15 and 17 of the output stage.

Figure 4:
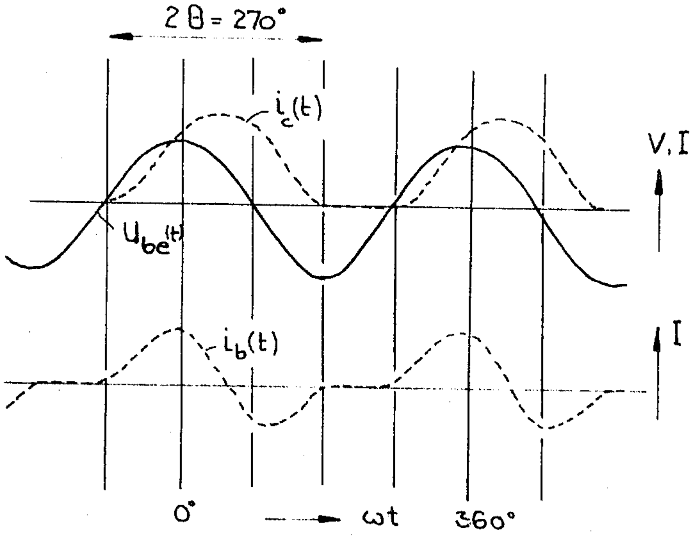
FIG. 4 is a view similar to that of FIG. 3 relating to different operating conditions for the circuit of FIG. 2.
Figure 8:
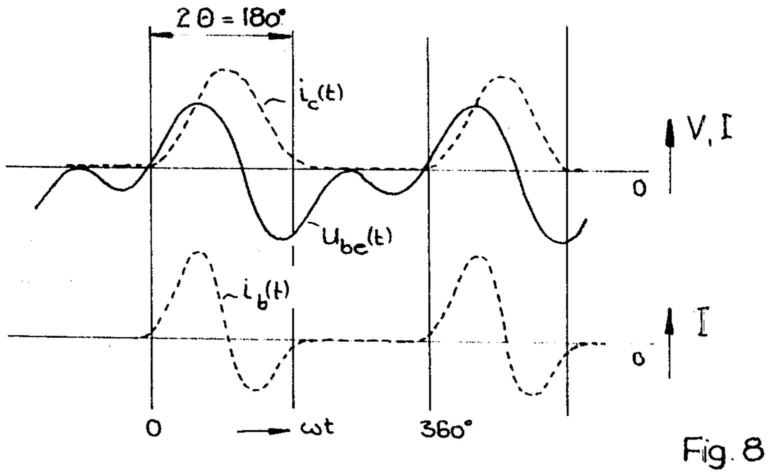
FIG. 8 is a view similar to that of FIG. 4 illustrating one type of operation of the circuit.

FIG. 4 shows the oscillograph recordings of $i_c(t)$ and $i_b(t)$ when a sinusoidal control voltage $u_{be}(t)$ is applied and when the amplifier is undergoing Class B operation at a frequency of $w>w_1$, whereas current flow period $\theta\approx135°$ resulted, and where, at $\bar{P}_v=4W$ and $\bar{U}_{ce}=20\ V$, the maximum alternating current power is $\tilde{P}\approx6W$. If a voltage component at a frequency of $2w$ is added to the control voltage, in accordance with the invention, it is possible, again with $\bar{U}_{be}=0, \bar{U}_{ce}=20\ V$ and $\bar{P}_v=4\ W$, and with appropriate control voltage adjustments, to achieve a maximum alternating current power transfer of $\tilde{P}\approx10\ W$. The resulting waveforms of $I_c(t)$, $u_{be}(t)$ and $i_b(t)$ are shown in FIG. 8.

A further technique, according to the invention, for creating an optimal waveform for control voltage $u_{be}(t)$ consists in deriving a corrective voltage from $i_b(t)$ and suitably superimposing it on the sinusoidal control voltage in a preliminary stage.

Figure 9:
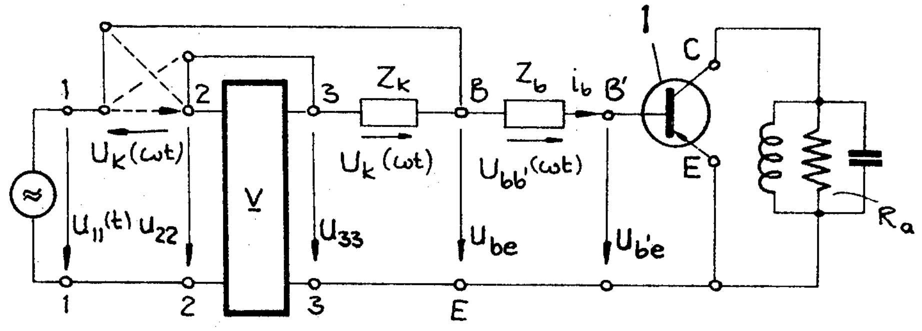
FIG. 9 is a simplified circuit diagram of another embodiment of the invention.

FIG. 9 shows, in simplified form, a circuit for this purpose. An additional impedance $Z_K$ is connected in the external control circuit of the power transistor and a voltage drop $u_k(wt)$ occurs thereacross. This voltage is applied with the appropriate polarity, to the input of a preliminary stage in series with a source of the required sinusoidal control voltage $U_{11}(t)$. An amplifier V is provided to produce the complex voltage amplification of this preliminary stage required to completely compensate the voltage drop across the internal complex base impedance $Z_b$ of the power transistor, this compensation occurring if the following equation is satisfied:

$\pm u_k(wt)\cdot\underline{V}-[u_{bb'}(wt)+u_k(wt)]=0$, where $\underline{V}$ is the amplification factor of amplifier V. It is here necessary that $$\underline{V}=1+\frac{u_{bb'}(wt)}{u_k(wt)}$$

and this requirement must be at least approximately satisfied over the range of the significant frequencies.

Finally, the correction voltage which must be superimposed on the external sinusoidal control voltage in order to arrive at the desired, for example sinusoidal, waveform of the internal control voltage during the current flow period $2\ \theta$, can also be derived from the collector or emitter current of the power transistor. With a sinusoidal internal control voltage $u_{b'e}(wt)$, the idealized waveform of $i_c(wt)$ is given by equation (2). If this current flows through a semiconductor diode, whose forward current $I_{DO}$, at a diode voltage $U_D=0$, is equal to the $I_{CO}$ of the transistor, a voltage having a sinusoidal waveform, $u_D(wt)$, will appear across this diode and such waveform will be approximately equal to that of the sinusoidal internal control voltage $u_{b'e}(wt)$ when the peak of $i_c(wt)$ flows through the diode in its forward direction. If the waveform of the collector current deviates from that given by equation (2), the waveform of $u_D(wt)$ will also deviate from a sinusoidal shape. This deviation could be utilized to correct the control voltage.

Figure 10:
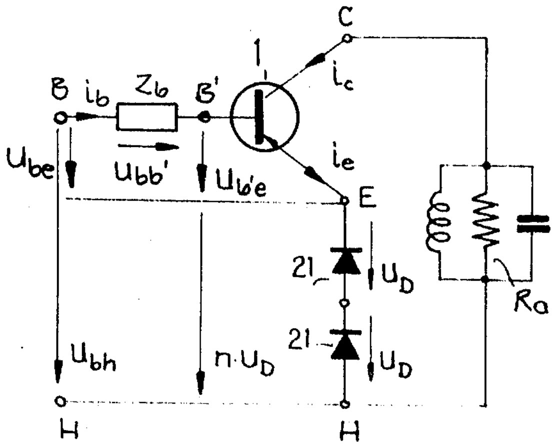
FIG. 10 is a simplified circuit diagram of a further embodiment of the invention.

For this purpose, a diode or a plurality $n$ of identical diodes 21, as shown in FIG. 10, are connected in the emitter lead of the power transistor so that a current $i_e(wt)=i_c(wt)+i_b(wt)$ flows therethrough. If the relationship $$i_b(wt)=\frac{i_c(wt)}{\beta}+\Delta i_b(wt)$$

is used, where $\Delta i_b(wt)$ represents the above-discussed additional component which is proportional to the waveform of the differential of $i_c(wt)$, and if the voltage $u_{b'h}(wt)$ is considered to be present between points B' and H of the circuit of FIG. 10, the following applies:

$$i_e(wt) = I_{c0}\left(1+\frac{1}{\beta}\right)\left[1+\frac{\Delta i_b(wt)}{i_c(wt)\left(1+\frac{1}{\beta}\right)}\right]\exp\left(u_{b'e}(wt)/U_T\right)$$

and furthermore $$i_e(wt) = I_{DO}\exp\left[u_D(wt)/U_T\right]$$

If $I_{DO}=I_{CO}\left(1+\frac{1}{\beta}\right)$, it results that $$u_D(wt) = u_{b'e}(wt) + U_T \ln \Delta$$

where $$\Delta = 1+\frac{\Delta i_b(wt)}{i_c(wt)\left(1+\frac{1}{\beta}\right)}$$

For a first approximation, it can be considered that $$U_T \ln \Delta \ll u_{b'e}(wt) \approx 0$$

so that $$u_D(wt) \approx u_{b'e}(wt)$$

When $n$ identical diodes are connected, it results that $$u_{b'e}(wt) = u_{bh}(wt) - u_{bb'}(wt) - nu_D(wt) \approx \frac{u_{bh}(wt)}{n+1} - \frac{u_{bb'}(wt)}{n+1}$$

The influence of the voltage drop $u_{bb'}(wt)$ is thus reduced, by connection of the diodes, by the factor $1/n+1$). The resulting corresponding reduction of the amplitude of the sinusoidal external control voltage $u_{bh}(wt)$ can be easily compensated by an increase in the preamplification employed.

The diodes in the emitter lead can be manufactured together with the power transistor. If the latter is fabricated by the parallel connection of a number of smaller transistor elements, it is advantageous to form diodes in the emitter lead of each transistor element. This circuit has the advantage that the influence of an impedance $Z_e$ in the emitter lead can also be simultaneously compensated. The above assumption that $U_T$l*na*⅔€0 is, of course, often not sufficiently accurate. This factor, however, essentially results in a disturbing wave which superimposes itself on the ideal waveform of the collector current represented by equation (2) without exerting any adverse influence on the power output of the control frequency.

The result of any one of the techniques according to the invention is that the forward conduction period of the external control voltage applied between terminals B and E of the power transistor becomes shorter than the desired current flow period of the collector current and that thus the adverse effect of the reverse current flowing in the base lead is compensated to a noticeable extent.

In the foregoing description it was assumed that the various semiconductor devices, transistors or diodes, required for the correction of the control voltage can operate at the higher frequencies of interest. This requirement must be met because it results in a considerably lower power dissipation than that occurring in the power transistor of the final stage where structural elements with higher limit frequencies are available.

It will be understood that the above description of the present invention is susceptible to various modifications, changes and adaptations.

I claim:

1. In a transistorized power amplifier including a transistor having external base, emitter and collector terminals and a source of an alternating control voltage which is to be amplified by said transistor, the improvement comprising: means connected to the external base terminal of said transistor for deriving a correction voltage proportional to the base current of said transistor; and means connected between said transistor base terminal, said source and collector deriving means for combining said control voltage with said correction voltage and applying such combined voltage to said transistor base terminal, and for giving the correction voltage portion of such combines voltage a value which substantially balances out the voltage existing between said transistor base terminal and the base-emitter junction of said transistor, thereby compensating for the voltage drops across the impedances through which the base current flows between said base terminal and the base-emitter junction so as to impart the desired waveform to the output current at said collector terminal.

2. An arrangement as defined in claim 1 wherein the alternating voltage applied by said supply means is shaped for causing the voltage across the emitter-base junction to have a sinusoidal waveform.

3. An arrangement as defined in claim 1 wherein said amplifier is biassed to operate as a Class B device.

4. An arrangement as defined in claim 3 wherein the alternating voltage from said supply means is shaped for causing the voltage across the emitter-base junction to have sinusoidal waveform during the forward current conduction periods of amplifier operation.

5. An arrangement as defined in claim 1 wherein said correction voltage contains at least one harmonic of the fundamental frequency of the transistor output signal.

6. An arrangement as defined in claim 1 wherein said means connected to the base terminal include an impedance connected between said base terminal and said combining means.

7. An arrangement as defined in claim 1 wherein said combining means include an amplifier.

8. An arrangement as defined in claim 1 wherein said amplifier is biased to operate as a Class C device.